No. 684,922. Patented Oct. 22, 1901.
W. R. DONALDSON.
TREAD SHOE FOR VEHICLE WHEELS.
(Application filed Nov. 15, 1900.)
(No Model.) 2 Sheets—Sheet 1.
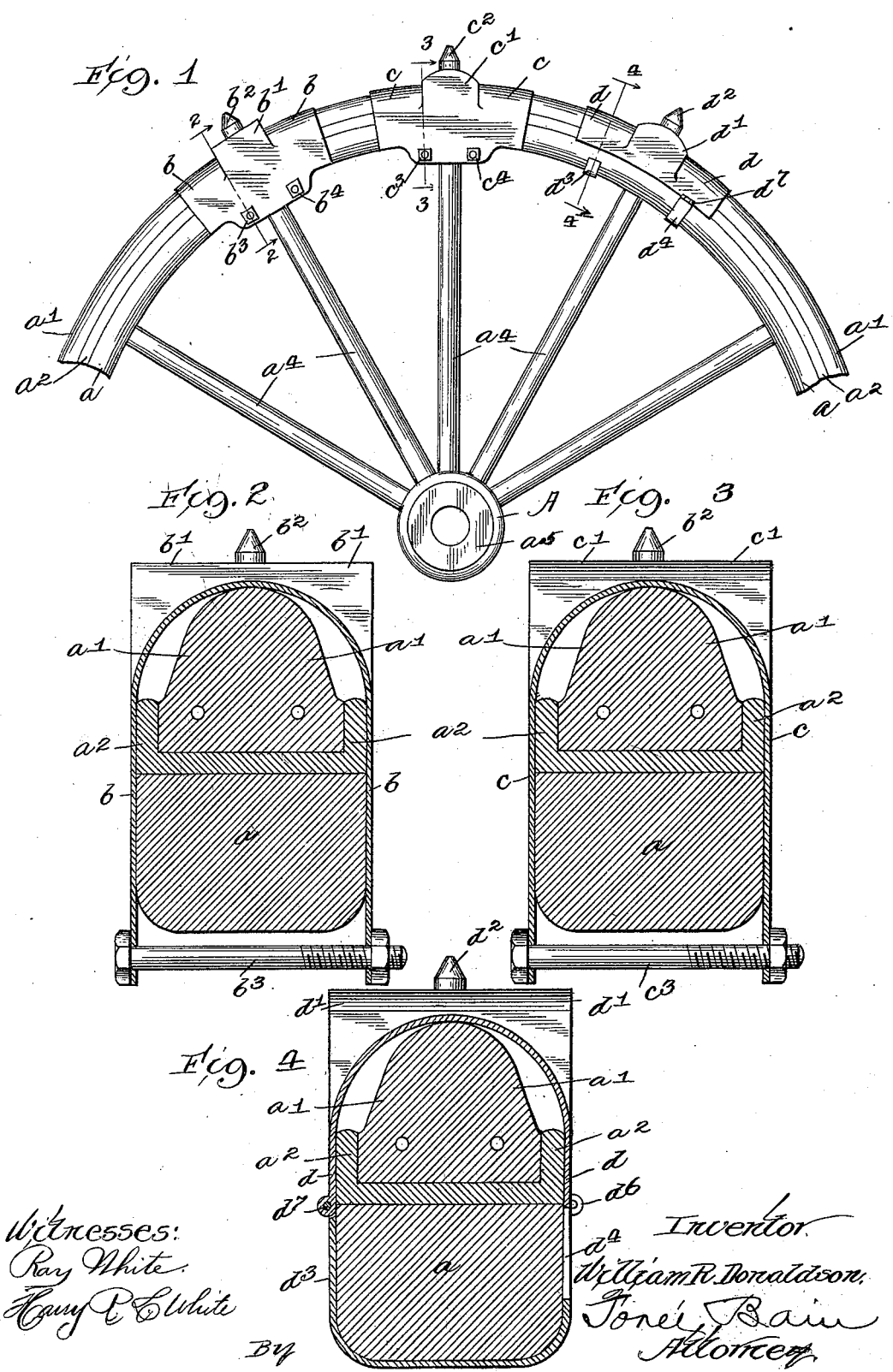

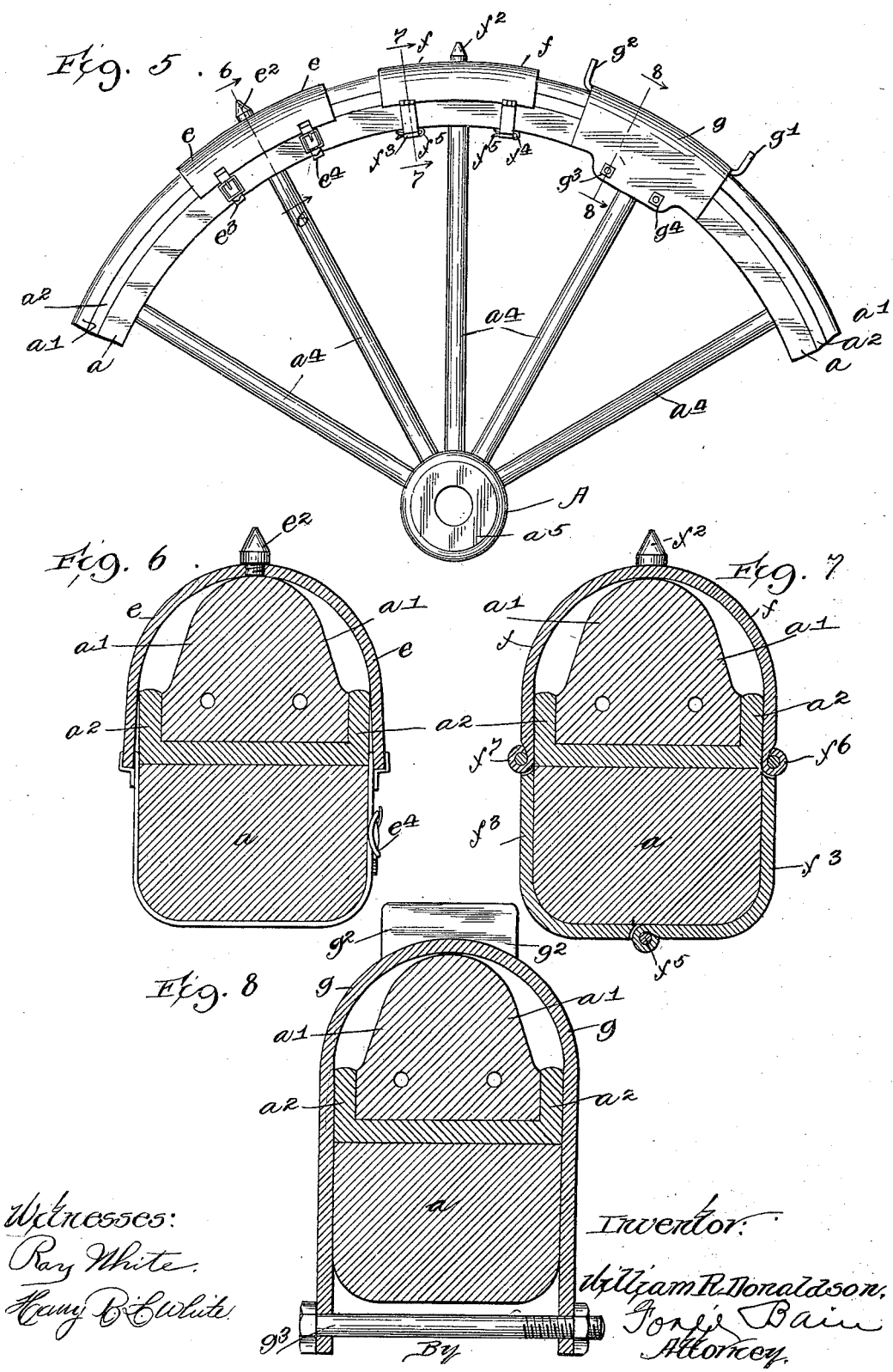

UNITED STATES PATENT OFFICE.

WILLIAM R. DONALDSON, OF CHICAGO, ILLINOIS, ASSIGNOR OF TWO-THIRDS TO WILLIAM O. WORTH, OF CHICAGO, ILLINOIS, AND HENRY W. KELLOGG, OF BATTLECREEK, MICHIGAN.

TREAD-SHOE FOR VEHICLE-WHEELS.

SPECIFICATION forming part of Letters Patent No. 684,922, dated October 22, 1901.

Application filed November 15, 1900. Serial No. 36,590. (No model.)

*To all whom it may concern:*

Be it known that I, WILLIAM R. DONALDSON, a citizen of the United States, residing at Chicago, county of Cook, and State of Illinois, have invented certain new and useful Improvements in Tread-Shoes for Vehicle-Wheels; and I do hereby declare the following to be a full, clear, and exact description of the invention, such as will enable persons skilled in the art to which it appertains to make and use the same.

My invention relates to improvements in detachable tread-shoes for vehicle-wheels.

One of the objects of my invention is to provide a series of independently-detachable tread-shoes which may be applied to a vehicle-wheel, another object being to provide a fastening for each of the independent shoes, so arranged that it either embraces the respective spoke of the wheel or is attached on either side thereof and is held in place by means of its contact with the felly of the wheel.

One of the principal features of my device consists in providing single independent shoes that may be attached to the wheel and separated from each other on the tire of the said wheel in positions equal to the distance between the respective spokes or between any two spokes of the said wheel.

Another object of my invention is to provide a shoe which is held in position on the tire of the wheel and prevented from shifting thereon by the effect of an attaching device which is secured on either side of any one of the said spokes, the shoe having contact upon the rubber tire of the wheel and being adapted in its movement to follow the elasticity of the tire, being loosely held with reference to its radial position by the said device, but firmly held circumferentially.

In the drawings, Figure 1 shows a portion of a vehicle-wheel with several of the various forms of my device attached thereto. Fig. 2 is a section through line 2 2, Fig. 3 is a section through line 3 3 and Fig. 4 is a section through line 4 4, all of Fig. 1. Fig. 5 is another broken-away portion of a vehicle-wheel, showing several devices attached thereto. Fig. 6 is a section through line 6 6, Fig. 7 is a section through line 7 7, and Fig. 8 is a section through line 8 8, all of Fig. 5.

In all of the devices shown the same features are involved—that is to say, the method of attaching the device to the wheel permits the free and easy motion of the said device as it follows the elastic movement of the tire.

In all of the views the same letters of reference are used to indicate similar parts.

A is a broken-away portion of a vehicle-wheel. $a$ is the felly of the said wheel. $a'$ is the usual rubber tire, and $a^3$ is the flange which holds the said rubber tire to the felly. $a^4$ represents the spokes of the said wheel.

In all of the views, $b$, $c$, $d$, $e$, $f$, and $g$ in the various shoes indicate pieces of sheet metal that are curved to fit the form of the rim of the wheel and to come in contact with the circumferential portion of the tire. $b'$, $c'$, and $d'$ are centrally-enlarged portions providing laterally-extending drivers made into the side of the said curved sheet-metal shoes, by means of which the traction force of the wheel is increased.

Studs $b^2$, $c^2$, $d^2$, $e^2$, and $f^2$ are fixed into the central portion of the curved sheet-metal shoe for the purpose of increasing the tractive effect of the wheel when passing over such road-surfaces where these shaped devices may be required, as when passing over frozen ground or slippery places in the roadway where the ordinary traction-surface of the wheel is not sufficient to prevent it from slipping. $g$ and $g^2$ show a means by which these pointed surfaces may be made of the integral piece of the shoe of sheet metal and turned up at the ends, as shown in Figs. 5 and 8. I have shown various means by which these independently-detachable shoes may be held on the wheel. Figs. 2, 3, and 8 show the manner in which bolts may be used for this purpose, and in Fig. 4 the curved portions $d^3$ and $d^4$ are hinged at $d^6$ and $d^7$. The piece $d^3$ is shown as partially embracing the felly of the wheel. The piece $d^4$ embraces the wheel to the same degree on the opposite side, but is not shown in Fig. 4. This shoe may be applied to the wheel by compressing the rubber tire until the pieces $d^3$ and $d^4$ may be easily slipped over the felly, when the resilience of the tire will hold the device in the position shown. The pieces $d^3$ and $d^4$ are hinged to the shoe on either side of the spokes, so that the circumferential shifting of the device will be limited to the space between the two attaching-clips on either side of the spoke.

In Fig. 6 the device is shown to be attached to the felly of the wheel by means of leather straps and buckles $e^3$ and $e^4$.

In Fig. 7 the pieces $f^3$ are hinged, as shown in Fig. 4; but they are held in place by means of the cotter-pins $f^4$ and $f^5$. (Shown in Fig. 5.)

There may be devices other than those which I have illustrated which may be applied and used with equal facility to those that I have shown without departing from the gist and spirit of my invention. I have shown a sufficient number to illustrate the object which I have in view—that is to say, a separable separate independent removable shoe which may be applied to a vehicle-wheel around the tire at as many points as desirable and which may be adapted to move radially with the resilience of the tire upon which it bears. The device is held from shifting upon the surface of the wheel by means of attaching devices, which are secured on either side of the said spokes. These shoes may be applied to the wheel easily and quickly and at any time. They are light, do not occupy much room in the vehicle when not in use, and are adapted to be used only at such times when the vehicle is passing over roads whereby their use becomes imperative.

Having described my invention, what I claim as new, and desire to secure by Letters Patent of the United States, is—

1. A detachable tread-shoe for vehicle-wheels, comprising an independent, removable shoe, and an attachment on each side of a spoke of said wheel for holding said shoe in place upon the tire of said wheel, substantially as set forth.

2. A detachable tread-shoe for vehicle-wheels, comprising an independent, removable shoe, and an attachment on each side of a spoke of said wheel for holding said shoe in place upon the tire of said wheel, substantially as set forth.

3. A detachable tread-shoe for vehicle-wheels, comprising an independent, removable shoe, an attachment on each side of a spoke of said wheel for holding said shoe to prevent circumferential displacement, said shoe free to move radially from center of said wheel, substantially as set forth.

4. A detachable tread-shoe for vehicle-wheels, comprising a shoe curved to conform to the circumference of the tire of said wheel, and curved transversely, having a longer radius than that of the transverse curve of the tire upon which it is adapted to rest, and an attachment on each side of a spoke of said wheel for holding said shoe upon the tire of said wheel against circumferential displacement, substantially as set forth.

In testimony whereof I have signed this specification, in the presence of two subscribing witnesses, this 5th day of November, A. D. 1900.

WILLIAM R. DONALDSON.

Witnesses:
 FORÉE BAIN,
 M. F. ALLEN.